(12) United States Patent
Asai

(10) Patent No.: US 11,526,529 B2
(45) Date of Patent: Dec. 13, 2022

(54) EFFICIENT DISCOVERY OF A BINARY TREE PATTERN FROM A LARGE AMOUNT OF BINARY TREE DATA

(71) Applicant: FUJITSU LIMITED, Kawasaki (JP)

(72) Inventor: Tatsuya Asai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 384 days.

(21) Appl. No.: 16/670,405

(22) Filed: Oct. 31, 2019

(65) Prior Publication Data
US 2020/0151190 A1    May 14, 2020

(30) Foreign Application Priority Data
Nov. 8, 2018   (JP) .............................. JP2018-210532

(51) Int. Cl.
G06F 16/25    (2019.01)
G06F 16/22    (2019.01)

(52) U.S. Cl.
CPC ........ G06F 16/258 (2019.01); G06F 16/2246 (2019.01)

(58) Field of Classification Search
CPC .............. G06F 16/258; G06F 16/2246; G06F 16/9027; G06F 16/1794
See application file for complete search history.

(56) References Cited

U.S. PATENT DOCUMENTS

| | | | |
|---|---|---|---|
| 7,451,144 B1* | 11/2008 | Koudas ................. | G06F 16/83 707/E17.127 |
| 2004/0019598 A1* | 1/2004 | Huang .................. | G16H 50/70 |
| 2005/0187900 A1* | 8/2005 | LeTourneau ........ | G06F 16/2246 |
| 2006/0129582 A1* | 6/2006 | Schiffmann ......... | G06F 16/2246 |
| 2012/0023082 A1* | 1/2012 | Kotha .................. | G06F 16/2246 707/706 |
| 2013/0339339 A1* | 12/2013 | Qin ..................... | G06F 16/2246 707/E17.017 |
| 2015/0073753 A1* | 3/2015 | Rameau ................ | G06F 30/00 703/1 |
| 2017/0091670 A1* | 3/2017 | Gulin ................... | G06N 5/02 |

(Continued)

FOREIGN PATENT DOCUMENTS

| | | |
|---|---|---|
| JP | 2009-163564 | 7/2009 |
| JP | 2018-018716 | 2/2018 |
| JP | 2019-135634 | 8/2019 |

OTHER PUBLICATIONS

Eiji Takimoto, et al., Top-Down Decision Tree Boosting and Its Applications, Progress in Discovery Science pp. 327-337 (Year: 2002).*

(Continued)

*Primary Examiner* — Cheyne D Ly
(74) *Attorney, Agent, or Firm* — Fujitsu Patent Center

(57) ABSTRACT

An apparatus decomposes a first binary tree pattern into combinations of multiple binary tree units in accordance with a predetermined procedure. When a second binary tree pattern configured as a combination of binary tree units that are among the multiple binary tree units and include a top binary tree unit of the multiple binary units is associated with a subset of a target binary tree data, the apparatus searches the target binary tree data for the first binary tree pattern by using positions of the subset within the target binary tree data.

20 Claims, 7 Drawing Sheets

(56) References Cited

U.S. PATENT DOCUMENTS

2019/0236078 A1* 8/2019 LeTourneau ........ G06F 16/2246
2019/0243811 A1  8/2019 Asai

OTHER PUBLICATIONS

Naylor et al., Merging BSP Trees Yields Polyhedral Set Operations, Computer Graphics, vol. 24, No. 4, Aug. 1990, pp. 115-124. (Year: 1990).*
Yin et al., Tree-based Classifiers for Bilayer Video Segmentation, Proc. Conf. Computer Vision and Pattern Recognition | Jan. 2007, pp. 1-8. (Year: 2007).*
Tatsuya Asai, et al., "Efficient Substructure Discovery from Large Semi-structured Data," Proc. pp. 158-174, SDM2002.

* cited by examiner

EFFICIENT DISCOVERY OF A BINARY TREE PATTERN FROM A LARGE AMOUNT OF BINARY TREE DATA

CROSS-REFERENCE TO RELATED APPLICATION

This application is based upon and claims the benefit of priority of the prior Japanese Patent Application No. 2018-210532, filed on Nov. 8, 2018, the entire contents of which are incorporated herein by reference.

FIELD

The embodiments relate to efficient discovery of a binary tree pattern from a large amount of binary tree data.

BACKGROUND

One of basic data structures for information processing is data (hereinafter also referred to as "binary tree data") with a binary tree structure. For example, binary tree data is used in a wide range of fields such as the artificial intelligence (AI) field and the field of decision trees.

A position where a subtree that has labels matching labels held in nodes of a specific binary tree pattern appears is searched in the binary tree data. For example, while the binary tree pattern is scanned in the binary tree data from a root of the binary tree data toward a lower layer of the binary tree data, each of nodes of the binary tree pattern is associated with subtrees of the binary tree data. A search for the binary tree pattern is executed by comparing labels of all the nodes of the binary tree pattern with labels of the subtrees of the binary tree data and determining whether the labels of the nodes of the binary tree pattern match the labels of the subtrees of the binary tree data.

An example of related art is Japanese Laid-open Patent Publication No, 2009-163564.

Another example of related art is "Tatsuya Asai, et al., "Efficient substructure discovery from large semi-structured data," Proc. SDM2002, 158-174".

SUMMARY

According to an aspect of the embodiments, an apparatus decomposes a first binary tree pattern into combinations of multiple binary tree units in accordance with a predetermined procedure. When a second binary tree pattern configured as a combination of binary tree units that are among the multiple binary tree units and include a top binary tree unit of the multiple binary units is associated with a subset of a target binary tree data, the apparatus searches the target binary tree data for the first binary tree pattern by using positions of the subset within the target binary tree data. In the predetermined procedure, the apparatus expands a first stump, configured as a minimum binary tree which includes a left child and a right child and whose root is not coupled to a stump, to a tree structure of stumps by repeating coupling of a new stump to a connection target stump, among the tree structure of stumps including the first stump, to which the new stump is to be coupled, in accordance with a predetermined expansion procedure, such that one or both of the left child and the right child of the first stump is coupled to a root of a stump that is positioned at a top of a series of stumps each configured as a minimum binary tree including a root, a left child, and a right child. The apparatus generates the combinations of multiple binary tree units from the generated tree structure of stumps by expanding each stump included in the tree structure of stumps to a binary tree unit. In the predetermined expansion procedure, when the connection target stump is a first terminal stump that includes a right child and a left child both not coupled to a stump and is included in a rightmost stump column, which is a series of stumps that are included in the tree structure of stumps and obtained by tracing the tree structure of stumps from the first stump toward a stump coupled to a right child of the first stump or a stump coupled to a left child of the first stump when the right child of the first stump is not coupled to a stump, the apparatus expands the tree structure of stumps by coupling the new stump to a right child or a left child of the connection target stump. When the connection target stump is included in the rightmost stump column of the tree structure of the stumps and is not the first terminal stump, the apparatus expands the tree structure of stumps by coupling the new stump to the right child of the connection target stump. When the connection target stump is a second terminal stump that includes a right child and a left child both not coupled to a stump and is included in a leftmost stump column that is a series of stumps included in the tree structure of the stumps and obtained by tracing the tree structure of stumps from the first stump toward a stump coupled to a left child of the first stump or a stump coupled to a right child of the first stump when the left child of the first stump is not coupled to a stump, the apparatus expands the tree structure of stumps by coupling the new stump to a right child or a left child of the connection target stump. When the connection target stump is included in the leftmost stump column of the tree structure of the stumps and is not the second terminal stump, the apparatus expands the tree structure of stumps by coupling the new stump to the left child of the connection target stump.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In the aforementioned technique, however, every time a binary tree pattern is added, each of all nodes of the binary tree pattern is associated with the subtrees of the binary tree data, and labels of the nodes of the binary tree pattern are compared with the labels of the subtrees of the binary tree data. In the case where a search for the binary tree pattern is executed, as the size of the binary tree data is larger, the amount of data to be processed for the search is larger. Thus, in the aforementioned technique, an increase in the speed of a search for a specific binary tree pattern is limited.

It is desirable to increase the speed of a search for a specific binary tree pattern.

Hereinafter, a search program, a search method, and a searching device, which are disclosed herein, are described with reference to the drawings. Embodiments do not limit techniques disclosed herein. The embodiments may be appropriately combined without contradiction of details of processes.

FIRST EMBODIMENT

Figure 1:
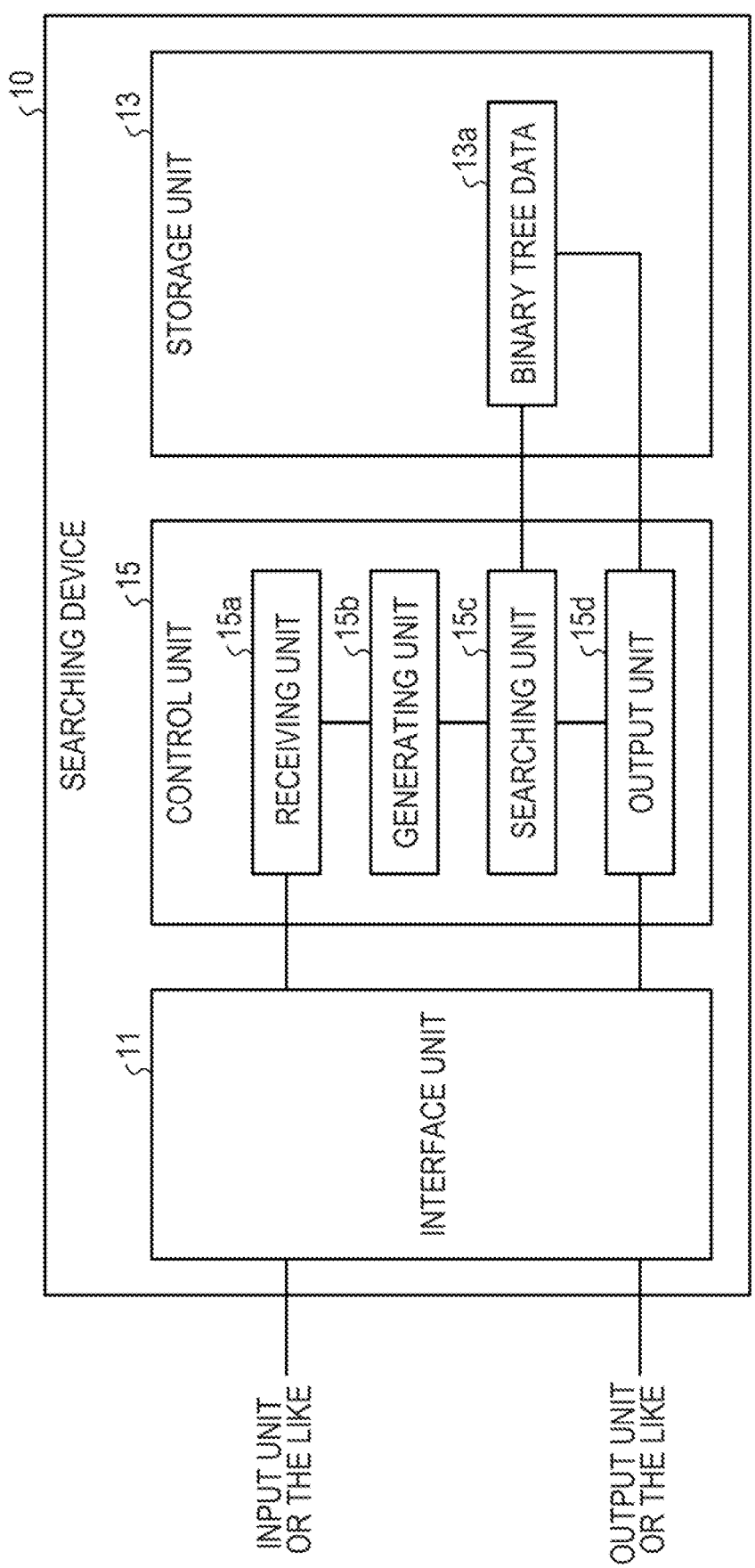
FIG. 1 is a block diagram illustrating an example of a functional configuration of a searching device according to a first embodiment.

FIG. 1 is a block diagram illustrating an example of a functional configuration of a searching device according to a first embodiment. A searching device 10 illustrated in FIG. 1 executes a search process of searching for a position where a subtree having labels matching labels held in nodes of a specific binary tree pattern appears in target binary tree data. As an aspect of the search process, there is difficulty to create a mechanism for increasing the speed of a search for a position where a specific binary tree pattern appears in the target binary tree data.

Before functional blocks of the searching device 10 according to the first embodiment are described, (1) an aspect of a subject of discussion is described and (2) an aspect of an approach for solving the subject is described after the description of (1).

(1) Aspect of Subject of Discussion

As described in BACKGROUND, in the aforementioned existing technique, every time a binary tree pattern is added, each of all nodes of the binary tree pattern is associated with subtrees of binary tree data, and labels of the nodes of the binary tree pattern are compared with labels of the subtrees of the binary tree data.

Figure 2:
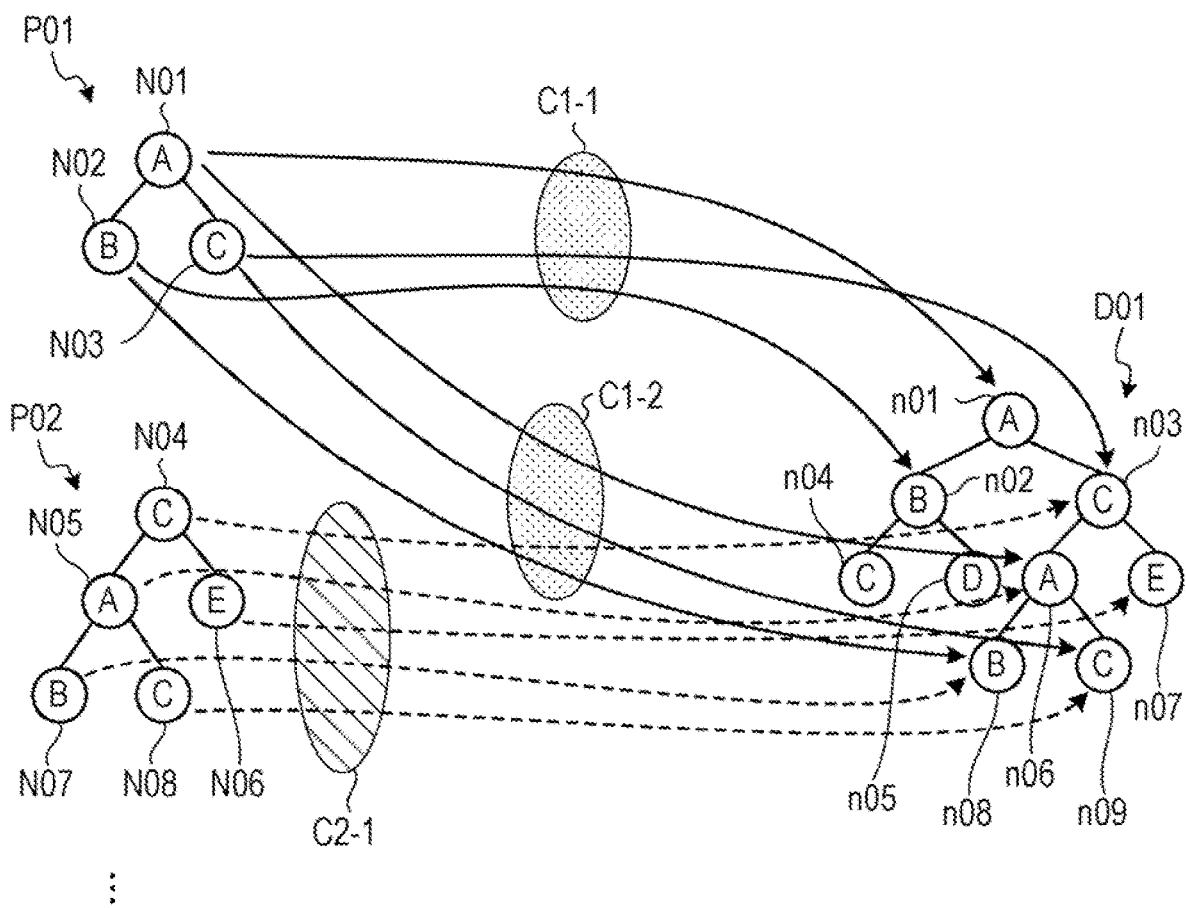
FIG. 2 is a diagram illustrating an example of associations between binary tree data and binary tree patterns.

FIG. 2 is a diagram illustrating an example of associations between binary tree data and binary tree patterns. FIG. 2 illustrates an example in which a binary tree pattern P01 and a binary tree pattern P02 are generated in this order, as an example of specific binary tree patterns whose appearance positions are searched in binary tree data D01. Each of the binary tree data D01, the binary tree pattern P01, and the binary tree pattern P02 has a tree structure in which each of all nodes does not have a child node or has two child nodes. Each of the binary tree data D01, the binary tree pattern P01, and the binary tree pattern P02 is a labeled binary tree in which a label is assigned to each of nodes. In FIG. 2, each of the nodes included in the binary tree structures is represented by a circle, and each of links (also referred to as edges) between the nodes is represented by a line. The labels assigned to the nodes are schematically indicated by uppercase alphabetical letters described in the circles corresponding to the nodes.

For example, in the aforementioned existing technique, when the binary tree pattern P01 is generated, the binary tree pattern P01 is scanned in the binary tree data D01 from a node n01 toward a lower layer of the binary tree data D01. The node n01 corresponds to a root of the binary tree data D01. First, a node N01 corresponding to a root of the binary tree pattern P01 is associated with the node n01 corresponding to the root of the binary tree data D01. When the node N01 corresponding to the root of the binary tree pattern P01 is associated with the binary tree data D01, nodes that are included in the binary tree data D01 and to be associated with nodes N02 and N03, which are child nodes of the node N01, are determined. For example, the node N02 of the binary tree pattern P01 is associated with a node n02 of the binary tree data D01, and the node N03 of the binary tree pattern P01 is associated with a node n03 of the binary tree data D01.

The labels of the nodes are crosschecked between the binary tree data D01 and the binary tree pattern P01. For example, the label of the node N01 and the label of the node n01 are crosschecked with each other to determine whether the label of the node N01 matches the label of the node n01. The label of the node N02 and the label of the node n02 are crosschecked with each other to determine whether the label of the node N02 matches the label of the node n02, The label of the node N03 and the label of the node n03 are crosschecked with each other to determine whether the label of the node N03 matches the label of the node n03. In the example illustrated in FIG. 2, the labels of the nodes N01 and n01 are "A" and match, the labels of the nodes N02 and n02 are "B" and match, and the labels of the nodes N03 and n03 are "C" and match. In this case, the nodes n01, n02, and n03 of the binary tree data D01 are obtained as appearance positions C1-1 of the binary tree pattern P01 in the binary tree data D01.

The association is repeatedly executed between nodes and the label crosschecking is repeatedly executed. In the example illustrated in FIG. 2, the search process is repeatedly executed 8 more times to associate the node N01 corresponding to the root of the binary tree pattern P01 with the nodes n02, n03, . . . , and n09 of the binary tree data D01.

For example, when the node N01 corresponding to the root of the binary tree pattern P01 is associated with the node n02 or n03 of the binary tree data D01, nodes to be associated with the nodes N02 and N03, which are the child nodes of the node N01 exist in the binary tree data D01. The labels of the nodes, however, do not match between the binary tree data D01 and the binary tree pattern P01. In these cases, an appearance position of the binary tree pattern P01 is not obtained as a search result. When the node N01 corresponding to the root of the binary tree pattern P01 is associated with each of the nodes n04, n05, and n07 to n09 of the binary tree data D01, nodes to be associated with the nodes N02 and N03, which are the child nodes of the node N01, do not exist in the binary tree data D01. In these cases, an appearance position of the binary tree pattern P01 is not obtained as a search result.

When the node N01 corresponding to the root of the binary tree pattern P01 is associated with the node n06 of the binary tree data D01, appearance positions C1-2 of the binary tree pattern P01 are obtained as a search result. For example, the nodes n08 and n09 exist in the binary tree data D01 as nodes to be associated with the nodes N02 and N03, which are the child nodes of the node N01. The labels of the nodes match between the binary tree data D01 and the binary tree pattern P01. As illustrated in FIG. 2, the labels of the nodes N01 and n06 are "A" and match, the labels of the nodes N02 and n08 are "B" and match, and the labels of the nodes N03 and n09 are "C" and match. In this case, as the appearance positions C1-2 of the binary tree pattern P01 in the binary tree data D01, the nodes n06, n08, and n09 of the binary tree data D01 are obtained.

Thus, the association is executed 9 times in total between the binary tree pattern P01 and the binary tree data D01. As a result, the appearance positions C1-1 and C1-2 of the binary tree pattern P01 in the binary tree data D01 are obtained.

In the aforementioned existing technique, when the binary tree pattern P02 is generated, the binary tree pattern P02 is scanned in the binary tree data D01 from the node n01 toward the lower layer of the binary tree data D01. The node n01 corresponds to the root of the binary tree data D01. Thus, the search process is repeatedly executed 9 times in total to associate the node N04 corresponding to a root of the binary tree pattern P02 with the nodes n01, n02, n03, ..., and n09 of the binary tree data D01 in this order.

When the node N04 corresponding to the root of the binary tree pattern P02 is associated with the node n01 of the binary tree data D01, nodes to be associated with the nodes N05 and N06, which are child nodes of the node N04, exist in the binary tree data D01, and nodes to be associated with the nodes N07 and N08, which are child nodes of the node N05, exist in the binary tree data D01. The labels of the nodes, however, do not match between the binary tree data D01 and the binary tree pattern P02. In this case, an appearance position of the binary tree pattern P02 is not obtained as a search result.

When the node N04 corresponding to the root of the binary tree pattern P02 is associated with each of the nodes n02, n04, and n05 to n09 of the binary tree data D01, nodes to be associated with the nodes N07 and N08, which are the child nodes of the node N05, do not exist in the binary tree data D01. In these cases, an appearance position of the binary tree pattern P02 is not obtained as a search result.

When the node N04 corresponding to the root of the binary tree pattern P02 is associated with the node n03 of the binary tree data D01, appearance positions C2-1 of the binary tree pattern P02 are obtained as a search result. For example, the nodes n06 and n07 exist in the binary tree data D01 as nodes to be associated with the nodes N05 and N06, which are the child nodes of the node N04, and the nodes n08 and n09 exist in the binary tree data D01 as nodes to be associated with the nodes N07 and N08, which are the child nodes of the node N05. The labels of the nodes match between the binary tree data D01 and the binary tree pattern P02. For example, as illustrated in FIG. 2, the labels of the nodes N04 and n03 match, the labels of the nodes N05 and n06 match, the labels of the nodes N06 and n07 match, the labels of the nodes N07 and n08 match, and the labels of the nodes N08 and n09 match. In this case, as the appearance positions C2-1 of the binary tree pattern P02 in the binary tree data D01, the nodes n03, n06, n07, n08, and n09 of the binary tree data D01 are obtained.

Thus, the association is executed 9 times in total between the binary tree pattern P02 and the binary tree data D01. As a result, the appearance positions C2-1 of the binary tree pattern P02 in the binary tree data D01 are obtained.

As described above, as the size of the binary tree data is larger, the number of times that the association of nodes is executed between a binary tree pattern and the binary tree data is larger. As the size of the binary tree data and the number of nodes of the binary tree pattern are larger, the number of times that the label crosschecking is executed is larger.

Under such circumstances, in the aforementioned existing technique, every time a new binary tree pattern is generated, the association is executed between each of nodes of the binary tree pattern and all nodes of the binary tree data.

For example, when the binary tree patterns P01 and P02 are generated, each of the node N01 corresponding to the root of the binary tree pattern P01 and the node N04 corresponding to the root of the binary tree pattern P02 is associated 9 times from the node n01 corresponding to the root of the binary tree data D01 toward the lower layer of the binary tree data D01 in the binary tree data D01. FIG. 2 illustrates the binary tree data D01 having the "9" nodes in order to describe only the key points. The number of nodes of the binary tree data to be searched may be significantly large. As the size of the binary tree data is larger, the number of times that the association is executed is larger.

In the aforementioned existing technique, every time a new binary tree pattern is generated, labels are crosschecked between the binary tree data and the binary tree pattern the number of times corresponding to the number of all nodes of the binary tree pattern.

For example, every time nodes included in the binary tree pattern P01 or P02 are associated with the binary tree data D01, labels are crosschecked the number of times corresponding to the number of all the nodes included in the binary tree pattern P01 or P02. For example, the 3 nodes N01 to N03 are included in the binary tree pattern P01. Thus, the label crosschecking is executed 3 times between the nodes N01 to N03 of the binary tree pattern P01 and 3 nodes included in the binary tree data D01 and associated with the nodes N01 to N03. The binary tree pattern P02 includes the 5 nodes N04 to N08. Thus, the label crosschecking is executed 5 times between the nodes N04 to N08 of the binary tree pattern P02 and 5 nodes included in the binary tree data D01 and associated with the nodes N04 to N08.

In the aforementioned existing technique, every time a new binary tree pattern is generated, a comprehensive search for the binary tree pattern is executed and the amount of data to be processed for the search increases. In the aforementioned existing technique, therefore, an increase in the speed of a search for a specific binary tree pattern is limited.

To avoid a comprehensive search for a binary tree pattern, the following problem-solution approach is considered to be effective. That is, the problem-solution approach is to narrow down data to be searched to a difference between a binary tree pattern generated first and a binary tree pattern generated next and search for the binary tree pattern generated next.

Figure 3:
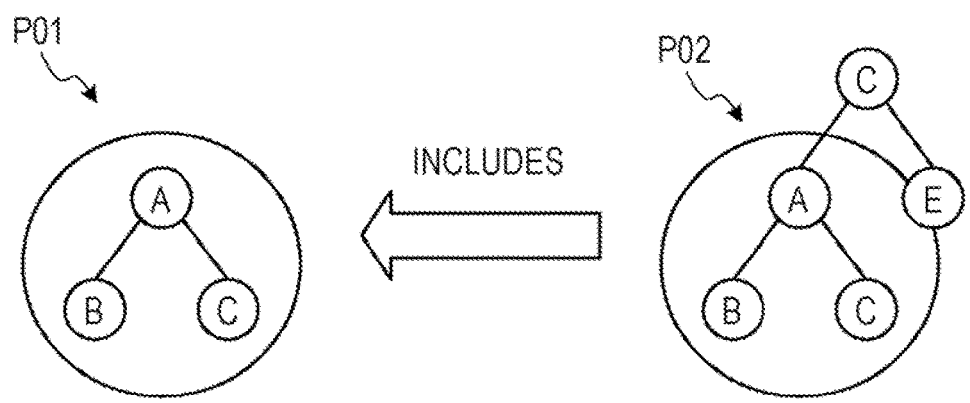
FIG. 3 is a diagram illustrating an example of an inclusion relationship between binary tree patterns.

FIG. 3 is a diagram illustrating an example of an inclusion relationship between binary tree patterns. FIG. 3 illustrates the binary tree patterns P01 and P02 illustrated in FIG. 2. In FIG. 3, the 3 nodes that are included in each of the binary tree patterns P01 and P02 and of which an array of the labels are common to the binary tree patterns P01 and P02 are surrounded by a circle. As illustrated in FIG. 3, the binary tree pattern P02 includes, as a subtree, the nodes N05, N07, and N08 of which an array of the labels matches an array of the labels of the nodes N01, N02, and N03 included in the binary tree pattern P0I. It is, therefore, apparent that the binary tree pattern P02 includes the binary tree pattern P01. It is expected to reduce the amount of data to be processed for the search, when the inclusion relationship between the binary tree patterns P01 and P02 is used to narrow down data to be searched to the nodes N04 and N06 serving as differences between the binary tree patterns P01 and P02, and the binary tree pattern P02 is searched in the binary tree data D01.

However, when the aforementioned problem-solution approach is used, there is difficulty for generation as follows. For example, when a certain binary tree pattern is newly generated, a binary tree pattern included in the newly generated binary tree pattern may not be already generated in the past. Even when binary tree patterns that have an inclusion relationship exist among a large group of binary tree patterns generated in the past, it is costly to search for the binary tree patterns that have the inclusion relationship from the large group. Even in the case where the cost of searching for the binary tree patterns in the binary tree data is reduced, when it is costly to search for the binary tree patterns that have the inclusion relationship, the priorities are misplaced. Eventually, in the aforementioned existing technique, when a new binary tree pattern is generated, it may be efficient to associate each of nodes of the new binary tree pattern with nodes of the binary tree data and crosscheck labels of the nodes of the new binary tree pattern with labels of the nodes of the binary tree data, like comprehensive label crosschecking.

(2) Aspect of Problem-Solution Approach

The searching device 10 according to the first embodiment has the advantage of using a binary tree generation algorithm to generate and uniquely enumerate a binary tree pattern by adding the minimum binary tree structure in specific order in order to use the aforementioned problem-solution approach. The minimum binary tree structure is referred to as stump. The stump includes a right child and a left child as child nodes.

The binary tree generation algorithm is described later in detail. In the case where a binary tree pattern is to be generated in accordance with the binary tree generation algorithm, the new binary tree pattern is generated by repeating a procedure for coupling a new stump to a binary tree pattern generated previously. Thus, while the newly generated binary tree pattern has an inclusion relationship with the binary tree pattern generated previously or includes the binary tree pattern generated previously, the newly generated binary tree pattern may be repeatedly expanded. Thus, since there is no case where only some binary tree patterns have an inclusion relationship, it may be possible to improve performance for narrowing down of a binary tree pattern to be searched to a difference between the binary tree pattern and another binary tree pattern.

Every time a binary tree pattern is generated, the searching device 10 according to the first embodiment associates identification information of the binary tree pattern with positions where right and left children of a certain stump appear in the binary tree data. The certain stump is prioritized over other stumps for coupling to a new stump in a tree structure of the binary tree pattern in the generation of a next binary tree pattern, or is included in a rightmost stump column (described later), or is a rightmost bottom stump (described later). The searching device 10 stores the positions associated with the identification information. The positions where the right and left children of the prioritized stump appear in the binary tree data are stored for the generation of the next binary tree pattern in order to narrow down data to be searched to the positions of nodes included in the binary tree data and to be associated with the binary tree pattern to be generated next. Hereinafter, the positions, which are stored for the generation of the next binary tree pattern and where the right and left children of the prioritized stump appear in the binary tree data, are referred to as "child node appearance positions of the prioritized stump" in some cases. Thus, since the next binary tree pattern may not be scanned in the binary tree data and nodes may not be associated in the generation of the next binary tree pattern, the number of times that association is executed between nodes may be reduced.

When the binary tree pattern is newly generated, the searching device 10 according to the first embodiment crosschecks labels of right and left children of the new stump added to the binary tree pattern generated previously with labels of the right and left children at the child node appearance positions, stored for the generation of the next binary tree pattern, of the prioritized stump. Thus, all nodes included in the newly generated binary tree pattern may be narrowed down to nodes of which labels are to be crosschecked with labels of nodes of the two right and left children of the new stump. As a result, the number of times that labels are crosschecked may be reduced.

Figure 4:
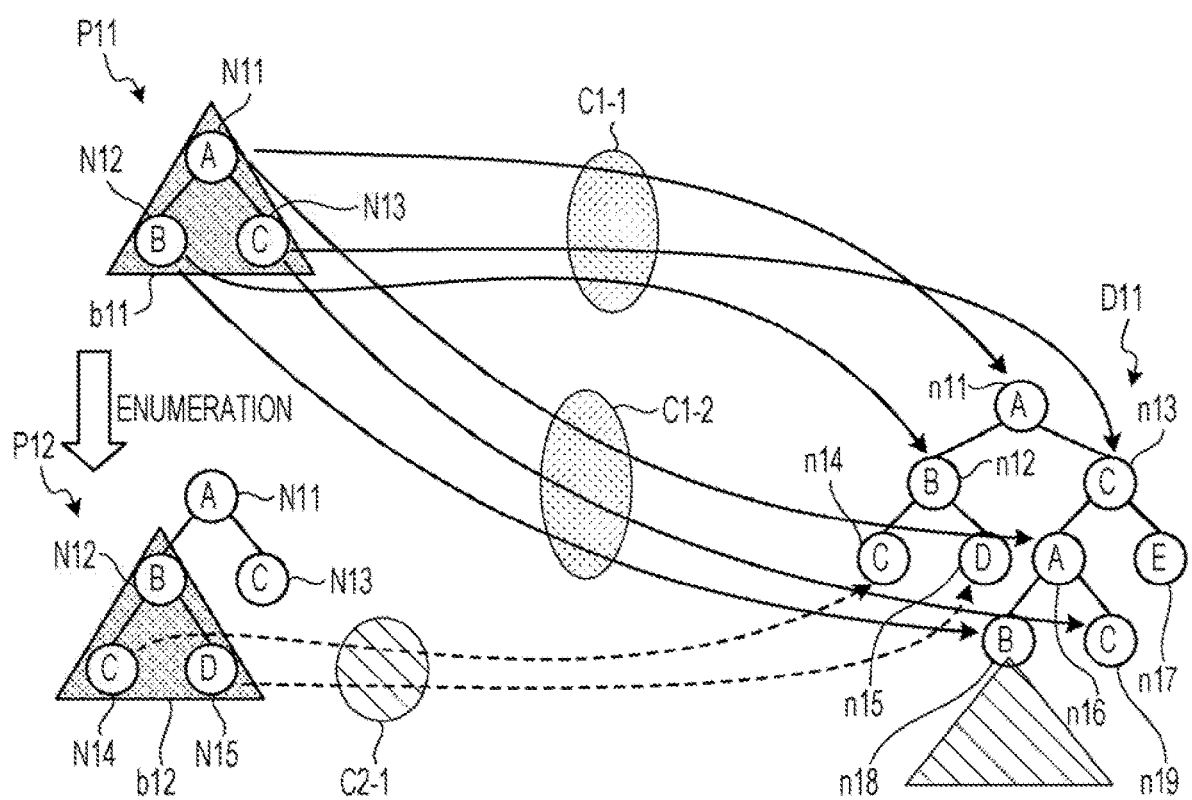
FIG. 4 is a diagram illustrating an example of associations between binary tree data and binary tree patterns.

FIG. 4 is a diagram illustrating an example of association between binary tree data and a binary tree pattern. FIG. 4 illustrates that nodes, links, and labels are represented in the same manner as FIG. 2. As illustrated in FIG. 4, binary tree patterns P11 and P12 are enumerated in this order by adding the minimum binary tree structure in specific order in accordance with the binary tree generation algorithm. As described above, the minimum binary tree structure is referred to as stump. The stump includes a right child and a left child as child nodes.

A stump b11 having 3 nodes is generated as the binary tree pattern P11. The 3 nodes of the stump b11 are a parent node N11 having a label "A" assigned thereto, a node N12 serving as a left child and having a label "B" assigned thereto, and a node N13 serving as a right child and having a label "C" assigned thereto. When the binary tree pattern P11 is generated first, the binary tree pattern P11 has only the stump bit Thus, the stump b11 corresponds to a prioritized stump. After the binary tree pattern P11 is generated, the binary tree pattern P11 is scanned in binary tree data D11 from a node n11 corresponding to a root of the binary tree data D11 toward a lower layer of the binary tree data D11. For example, an association process is repeatedly executed 9 times to associate a node N11 corresponding to a root of the binary tree pattern P11 with each of nodes n11, n12, n13, . . . , and n19 of the binary tree data D11.

For example, when the node N11 corresponding to the root of the binary tree pattern P11 is associated with the node n11 of the binary tree data D11, appearance positions C1-1 of the binary tree pattern P11 are obtained as a search result. For example, the nodes n12 and n13 exist in the binary tree data D11 as nodes to be associated with the nodes N12 and N13, which are child nodes of the node N11. In this case, labels of the nodes match between the binary tree data D11 and the binary tree pattern P11. As illustrated in FIG. 4, the labels of the nodes N11 and n11 are "A" and match, the labels of the nodes N12 and n12 are "B" and match, and the labels of the nodes N13 and n13 are "C" and match. In this case, as the appearance positions C1-1 of the binary tree pattern P11 in the binary tree data D11, the nodes n11, n12, and n13 of the binary tree data D11 are obtained.

Similarly to the above case, when the node N11 corresponding to the root of the binary tree pattern P11 is associated with the node n16 of the binary tree data D11, the nodes n16, n18, and n19 of the binary tree data D11 are obtained as appearance positions C1-2 of the binary tree pattern P11.

In another case, since nodes to be associated with the nodes N12 and N13, which are the child nodes of the node N11, do not exist in the binary tree data D11, or since labels of nodes do not match between the binary tree data D11 and the binary tree pattern P11 even in a state in which the nodes to be associated with the nodes N12 and N13 exist in the binary tree data D11, an appearance position of the binary tree pattern P11 is not obtained as a search result.

In addition to the search for the binary tree pattern P11, positions where the right and left children of the prioritized stump b11 of the binary tree pattern P11 appear in the binary tree data D11, or child node appearance positions of the prioritized stump b11 are stored. As an example, positions where the node serving as the left child of the prioritized stump b11 appears in the binary tree data D11, or the nodes n12 and n18 are associated with the binary tree pattern P11 and stored as left child appearance positions of the prioritized stump b11. Positions where the node serving as the right child of the prioritized stump b11 appears in the binary tree data D11, or the nodes n13 and n19 are associated with the binary tree pattern P11 and stored as right child appearance positions of the prioritized stump b11.

After the generation of the binary tree pattern P11, the binary tree pattern P12 is generated. For example, the binary tree pattern P12 is generated by coupling the left child of the prioritized stump b11 of the binary tree pattern P11 generated previously to a new stump b12. The new stump b12 includes a parent node N12 having the label "B", the node N14 serving as a left child and having the label "C", and the node N15 serving as a right child and having a label "D".

In a search for the binary tree pattern P12, positions of nodes in the binary tree data D11 where labels of the nodes of the binary tree data D11 are crosschecked with labels of the nodes of the binary tree pattern P12 are narrowed down to the right and left children at the child node appearance positions, stored for the generation of the new binary tree pattern P12 at the stage of generating the previous binary tree pattern P11, of the prioritized stump. In this case, the new stump b12 is coupled to the left child of the prioritized stump b11 of the binary tree pattern P11 in the expansion of the binary tree pattern P11. Thus, the left child appearance positions of the prioritized stump bit that are among the child node appearance positions of the prioritized stump b11 are referenced.

The nodes serving as the right and left children of the new stump b12 added to the binary tree pattern P11 generated previously are associated with the nodes serving as the right and left children at the left child appearance positions, stored at the stage of generating the binary tree pattern P11, of the prioritized stump b11. In this case, the left child appearance positions of the prioritized stump b11 are the positions of the 2 nodes n12 and n18, as described above. In the aforementioned existing technique, the association process is repeatedly executed 9 times to associate the node N11 corresponding to a root of the binary tree pattern P12 with the nodes n11, n12, n13, . . . , and n19 of the binary tree data D11. In the first embodiment, the association is executed only twice to associate the right and left children of the new stump b12 with the right and left children of the node n12 and the right and left children of the node n18. Thus, in the first embodiment, the number of times that the association is executed between the nodes is reduced by 7, compared with the aforementioned existing technique.

The node n12, which is among the left child appearance positions of the prioritized stump b11, has a right child and a left child. Thus, the node N14 serving as the left child of the new stump b12 and the node N15 serving as the right child of the new stump b12 are associated with the node n14 serving as the left child of the node n12 and the node n15 serving as the right child of the node n12. Labels of the nodes N14 and n14 are crosschecked with each other to determine whether the labels of the nodes N14 and n14 match, and labels of the nodes N15 and n15 are crosschecked with each other to determine whether the labels of the nodes N15 and n15 match. In the example illustrated in FIG. 4, the labels of the nodes N14 and n14 are "C" and match, and the labels of the nodes N15 and n15 are "D" and match. In this case, as differences between the binary tree pattern P11 and the binary tree pattern P12 or as appearance positions C2-1 of the left and right children of the new stump b12, the nodes n14 and n15 of the binary tree data D11 are obtained. The appearance positions C2-1 are appearance positions of the differences. Thus, when appearance positions of the entire binary tree pattern P12 are to be output, it is sufficient if appearance positions C1-1 of the binary tree pattern P11 and the appearance positions C2-1 of the differences are output. The node n18, which is among the left child appearance positions of the prioritized stump b11, does not have a right child and a left child. Thus, an appearance position of a difference between the binary tree pattern P11 and the binary tree pattern P12 is not obtained as a search result.

In the aforementioned existing technique, the 5 nodes N11 to N15 are included in the binary tree pattern P12, and thus the label crosschecking is executed 5 times to crosscheck the labels between the nodes N11 to N15 and the 5 nodes included in the binary tree data D11 and associated with the nodes N11 to N15 On the other hand, in the first embodiment, the label crosschecking is not executed 5 times corresponding to the number of all the nodes included in the binary tree pattern P12, and it is sufficient if the label crosschecking is executed only twice to crosscheck the labels of the 2 nodes serving as the right and left children of the new stump b12 with the labels of the nodes included in the binary tree data D11 and associated with the 2 nodes serving as the right and left children of the new stump b12. Thus, in the first embodiment, the number of times that the label crosschecking is executed is reduced by 3, compared with the aforementioned existing technique.

As described above, according to the searching device 10 according to the first embodiment, since the number of times that the association is executed between nodes and the number of times that the label crosschecking is executed may be reduced, a specific binary tree pattern may be searched at a high speed.

Configuration of Searching Device 10

As illustrated in FIG. 1, the searching device 10 includes an interface unit 11, a storage unit 13, and a control unit 15.

The interface unit 11 is a processing unit that couples the searching device 10 to an external device.

According to an aspect, the interface unit 11 transfers data between the searching device 10 and a peripheral device, for example, between an input unit (not illustrated) and an output unit (not illustrated), and communicates data between the searching device 10 and an external computer.

The storage unit 13 is a storage device that stores data to be used for various programs such as an operating system (OS) to be executed by the control unit 15, a search program for enabling the search process, an application program, and middleware.

In the first embodiment, the storage unit 13 may be implemented as an auxiliary storage device in the searching device 10. For example, as the storage unit 13, a hard disk drive (HDD), an optical disc, a solid state drive (SSD), or the like may be used. The storage unit 13 may not be implemented as the auxiliary storage device and may be implemented as a main storage device in the searching device 10.

In this case, as the storage unit 13, one or more of various semiconductor memory elements such as a random-access memory (RAM) and a flash memory may be used.

The storage unit 13 stores binary tree data 13a as an example of data to be used for the search program to be executed by the control unit 15. The storage unit 13 may store other electronic data as well as the aforementioned data. For example, the storage unit 13 may store, as a requirement for the generation of a binary tree pattern, the maximum size of the binary tree pattern to be generated in accordance with the binary tree generation algorithm. The maximum size of the binary tree pattern is, for example, the number of stumps, the depth of layers, or the like. The storage unit 13 may store, as a requirement for a search for a binary tree pattern, the depth of layers to be continuously searched in the binary tree data.

The binary tree data 13a is labeled binary tree data. The binary tree data 13a may be in a list format or a table format or expressed in a markup language such as eXtensible Markup Language (XML). As an example, the binary tree data 13a may be a decision tree learned by machine learning such as deep learning, a binary search tree to be used for a binary tree sort, an XML document, or the like.

The control unit 15 is a processing unit that controls the entire searching device 10.

In the first embodiment, the control unit 15 may be implemented by a hardware processor such as a central processing unit (CPU) or a microprocessor unit (MPU). As examples of the processor, the CPU and the MPU are described. The hardware processor, however, may be a general-purpose processor or a specific processor. The control unit 15 may be implemented by an arbitrary processor such as a graphics processing unit (GPU), a digital signal processor (DSP), or general-purpose computing on graphics processing units (GPGPU). The control unit 15 may be enabled by hardwired logic such as an application specific integrated circuit (ASIC) or a field-programmable gate array (FPGA).

The control unit 15 virtually enables the following processing units by loading the search program into a work area of a random-access memory (RAM) implemented as a main storage device (not illustrated).

As illustrated in FIG. 1, the control unit 15 includes a receiving unit 15a, a generating unit 15b, a searching unit 15c, and an output unit 15d.

The receiving unit 15a is a processing unit that receives a request to search for a binary tree pattern.

As an aspect, when the searching device 10 operates as a stand-alone, the receiving unit 15a may receive the request to search for the binary tree pattern via the interface unit 11 from an input unit (not illustrated). As another aspect, when the searching device 10 operates as a client server system while being coupled to a client terminal (not illustrated), the receiving unit 15a may receive the request to search for the binary tree pattern via the interface unit 11 from the client terminal (not illustrated).

The receiving unit 15a may receive various settings upon receiving the request to search for the binary tree pattern. For example, the receiving unit 15a may receive information specifying binary tree data to be searched to find a specific binary tree pattern from multiple binary tree data items stored as the binary tree data 13a in the storage unit 13. The receiving unit 15a may receive, as a requirement for the generation of a binary tree pattern, the maximum size of the binary tree pattern to be generated by the generating unit 15b (described later) in accordance with the binary tree generation algorithm. The maximum size of the binary tree pattern is, for example, the number of stumps, the depth of layers, or the like. The receiving unit 15a may receive, as a requirement for a search for a binary tree pattern, the depth of layers of the binary tree data to be searched to find the binary tree pattern.

The generating unit 15b is a processing unit that generates a binary tree pattern.

In the first embodiment, the generating unit 15b uniquely enumerates a binary tree pattern by adding the minimum binary tree structure in a specific order in accordance with the binary tree generation algorithm. The minimum binary tree structure is referred to as stump. The stump includes a right child and a left child as child nodes. As an example of the binary tree generation algorithm, a technique described in Japanese Patent Application No. 2018-018716 may be used.

Figure 5:
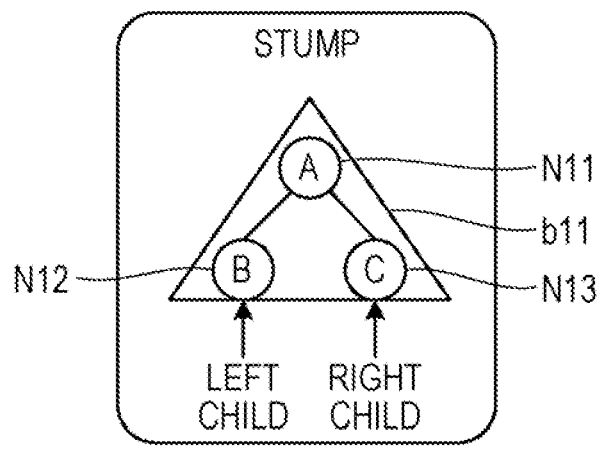
FIG. 5 is a diagram illustrating an example of a stump.

An example of a "stump" to be used for the binary tree generation algorithm is illustrated in FIG. 5. FIG. 5 is a diagram illustrating the example of the stump. As illustrated in FIG. 5, the stump b11 includes the 3 nodes, which are the parent node N11 having the label "A" assigned thereto, the node N12 serving as the left child and having the label "B" assigned thereto, the node N13 serving as the right child and having the label "C" assigned thereto. A single stump may be coupled to the node N12 serving as the left child. A single stump may be coupled to the node N13 serving as the right child.

For example, the generating unit 15b enumerates, in accordance with the binary tree generation algorithm, binary tree patterns by repeatedly expanding a binary tree pattern by adding a new stump to a right child included in a rightmost stump column included in the binary tree pattern or to a left child of a rightmost bottom stump included in the binary tree pattern. A series of binary tree patterns enumerated by repeatedly adding a stump has an inclusion relationship in which a binary tree pattern enumerated first is included in a binary tree pattern enumerated next.

The "rightmost stump column" is a series of stumps that are included in the binary tree pattern and are from a root stump, which has a parent node not coupled to another stump, to a terminal stump having right and left children not coupled to a stump through a stump coupled to a node serving as a right child or a stump coupled to a node serving as a left child when the stump coupled to the node serving as the right child does not exist. The "rightmost bottom stump" is a terminal stump belonging to the rightmost stump column and having left and right children that serve as child nodes and are not coupled to a stump.

Figure 6:
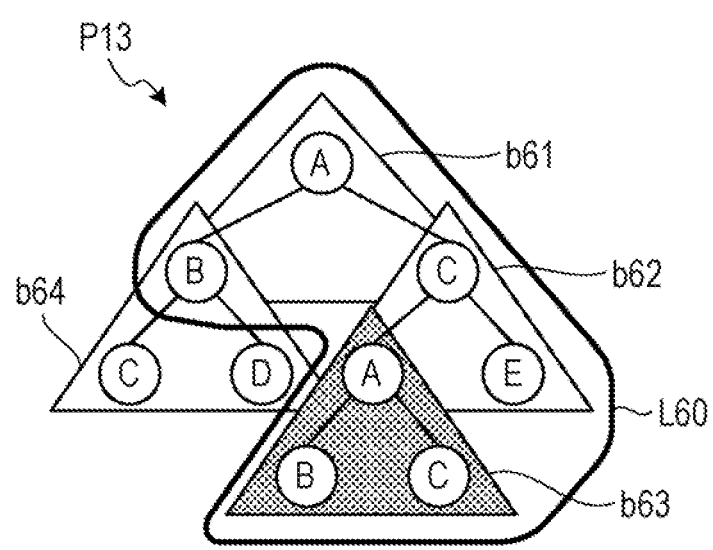
FIG. 6 is a diagram illustrating an example of a binary tree pattern.

FIG. 6 is a diagram illustrating an example of a binary tree pattern. FIG. 6 illustrates a binary tree pattern P13 generated in accordance with the binary tree generation algorithm. As illustrated in FIG. 6, to identify a rightmost stump column by tracing the binary tree pattern P13, a search for the rightmost stump column is started from a root stump b61. A node serving as a right child of the root stump b61 is coupled to a stump b62. Thus, the stump b62 is traced after the stump b61. A node serving as a right child of the stump b62 is not coupled to a stump. Thus, after the stump b62, a stump b63 coupled to a node serving as a left child of the stump b62 is traced. Since right and left children of the stump b63 are not coupled to a stump, the search for the rightmost stump column is terminated. A series of the stumps b61, b62, and b63 searched in the aforementioned manner is identified as a rightmost stump column L60. The terminal stump b63 is among the stumps b61, b62, and b63 belonging to the rightmost stump column L60 and has child nodes that serve as the left and right children and are not coupled to a stump.

The terminal stump b63 is identified as a rightmost bottom stump. The rightmost stump column L60 and the rightmost bottom stump b63 correspond to the aforementioned prioritized stump.

The searching unit 15c is a processing unit that searches for a specific binary tree pattern in binary tree data.

As an example, the searching unit 15c uses the following data to search for a binary tree pattern while managing the following data in a work area of a memory (not illustrated) accessible by the searching unit 15c for reading and writing. Examples of the data to be used to search for the binary tree pattern are "binary tree data D", a "binary tree pattern T", a "binary tree pattern T.S", a "left child appearance position list T.I of a rightmost bottom stump", and a "right child appearance position list T.r of the rightmost bottom stump".

In this case, the "binary tree data D" is searched to find a series of binary tree patterns. For example, the binary tree data D is stored in the work area when a request to search for a binary tree pattern is received or when information specifying a binary tree data item among the multiple binary tree data items stored as the binary tree data 13a in the storage unit 13 is received. The binary tree data D may not be specified from the binary tree data 13a and may be received via the interface unit 11 from an external.

Each of the "binary tree pattern T" and the "binary tree pattern T.S" is a binary tree pattern among a series of binary tree patterns generated in accordance with the binary tree generation algorithm, but the order that the binary tree pattern T is enumerated by the binary tree generation algorithm is different from the order that the binary tree pattern T.S is enumerated by the binary tree generation algorithm. The end labels "T" and "T.S" are provided in order to identify a binary tree pattern that is among the two binary tree patterns before and after a new stump S is added.

Each of the "left child appearance position list T.I of the rightmost bottom stump" and the right child appearance position list T.r of the rightmost bottom stump" is a list of a position where a left or right child of the rightmost bottom stump of the binary tree pattern T appears in the binary tree data D. For example, positions in the binary tree data D may be represented by identification information provided to nodes included in the binary tree data D.

Under the data management, every time a binary tree pattern T.S is generated by the generating unit 15b, the searching unit 15c executes the following process as one of purposes for outputting a left child appearance position list T.S.I of the binary tree pattern T.S and a right child appearance position list T.S.r of the binary tree pattern T.S. For example, the searching unit 15c initializes, to empty lists, the left child appearance position list T.S.I of the binary tree pattern T.S and the right child appearance position list T.S.r of the binary tree pattern T.S.

First, the searching unit 15c identifies whether the new stump S has been added to any of the following 3 nodes included in the binary tree pattern T. In accordance with the binary tree generation algorithm, the new stump S is added to any of (A) the left child of the rightmost bottom stump of the binary tree pattern T, (B) the right child of the rightmost bottom stump of the binary tree pattern T, and (C) a right child of a stump belonging to the rightmost stump column of the binary tree pattern T.

(A) Left Child of Rightmost Bottom Stump of Binary Tree Pattern T

When the new stump S is added to the left child of the rightmost bottom stump of the binary tree pattern T, the searching unit 15c extracts a node v from the left child appearance position list T.I of the rightmost bottom stump of the binary tree pattern T. The searching unit 15c crosschecks labels of left and right children v.l and v.r of the node v extracted from the left child appearance position list T.I of the rightmost bottom stump with labels of left and right children of the new stump S. In this case, when the label of the left child v.I of the node v matches the label of the left child of the new stump 5, and the label of the right child v.r of the node v matches the label of the right child of the new stump S, the searching unit 15c adds the left child v.I of the node v to the left child appearance position list T.S.I of the binary tree pattern T.S and adds the right child v.r of the node v to the right child appearance position list T.S.r of the binary tree pattern T.S.

(B) Right Child of Rightmost Bottom Stump of Binary Tree Pattern

When the new stump S is added to the left child of the rightmost bottom stump of the binary tree pattern T, the searching unit 15c extracts a node v from the right child appearance position list T.r of the rightmost bottom stump of the binary tree pattern T. The searching unit 15c crosschecks labels of left and right children v.I and v.r of the node v extracted from the right child appearance position list T.r of the rightmost bottom stump with the labels of the left and right children of the new stump S. In this case, when the label of the left child v.I of the node v matches the label of the left child of the new stump S, and the label of the right child v.r of the node v matches the label of the right child of the new stump S, the searching unit 15c adds the left child v.I of the node v to the left child appearance position list T.S.I of the binary tree pattern T.S and adds the right child v.r of the node v to the right child appearance position list T.S.r of the binary tree pattern T.S.

(C) Right Child of Stump Belonging to Rightmost Stump Column of Binary Tree Pattern T When the new stump S is added to the right child of the stump belonging to the rightmost stump column of the binary tree pattern T, the searching unit 15c extracts a node v from the left child appearance position list T.I of the rightmost bottom stump of the binary tree pattern T. When the new stump S corresponds to the aforementioned item C, it is apparent from the binary tree generation algorithm that the new stump S is not added to the left child (or the right child) of the rightmost bottom stump and is added to the right child of the stump that is in a top layer of the rightmost stump column and belongs to the rightmost stump column. Thus, a difference h, which is a number h of layers existing in a range from the left child (or right child) of the rightmost bottom stump of the binary tree pattern T to the right child of the stump that is in the top layer and belongs to the rightmost stump column of the binary tree pattern T, is calculated. Based on the difference h, the searching unit 15c crosschecks labels of left and right children $v^h.I$ and $v^h.r$ of a node $v^h$ included in a layer higher by the number h of layers than a layer including the node v extracted from the left child appearance position list T.I of the rightmost bottom stump with the labels of the left and right children of the new stump S. In this case, when the label of the left child $v^h.I$ of the node $v^h$ matches the label of the left child of the new stump, and the label of the right child $v^h.r$ of the node $v^h$ matches the label of the left child of the new stump, the searching unit 15c adds the left child $v^h.I$ of the node $v^h$ to the left child appearance position list T.S.l of the binary tree pattern T.S and adds the right child $v^h$.r of the node $v^h$ to the right child appearance position list T.S.r of the binary tree pattern T.S.

When multiple nodes v are registered in the left child appearance position list T.l or right child appearance position list T.r of the rightmost bottom stump, the multiple nodes v may be sequentially extracted and processes such as the aforementioned label crosschecking, the aforementioned list registration, and the like may be executed in this order, or the multiple nodes v may be extracted at one time and the processes may be executed in parallel.

The output unit 15d is a processing unit that outputs a result of searching for a binary tree pattern.

In the first embodiment, the output unit 15d may display and output various data and output audio based on left and right child appearance position lists T.S.l and T.S.r obtained for each of the binary tree patterns as a result of the search for the binary tree pattern by the searching unit 15c. For example, the output unit 15d may display an appearance position of the binary tree pattern T.S in the binary tree data D. In the case where the appearance position of the binary tree pattern T.S is displayed in this manner, the new stump S or appearance positions of the differences between the binary tree pattern T.S and the previously generated binary tree pattern T may be displayed based on the left child appearance position list T.S.l and the left child appearance position list T.S.r, and an appearance position of the entire binary tree pattern T.S may be displayed on the binary tree data D. The output unit 15d may display the number of times that the binary tree pattern T.S appears in the binary tree data D.

The output of the results of searching for the binary tree pattern is effective for various use cases. As an example, when a binary tree pattern is a "decision tree", information of the number of times that a subtree having the same structure as the binary tree pattern appears in the binary tree data may be given by outputting a result of searching for the binary tree pattern. As an aspect, the information may indicate how the decision tree functions. It is, therefore, possible to provide information effective to verify and inspect the decision tree.

OPERATIONAL EXAMPLE

Figure 7:
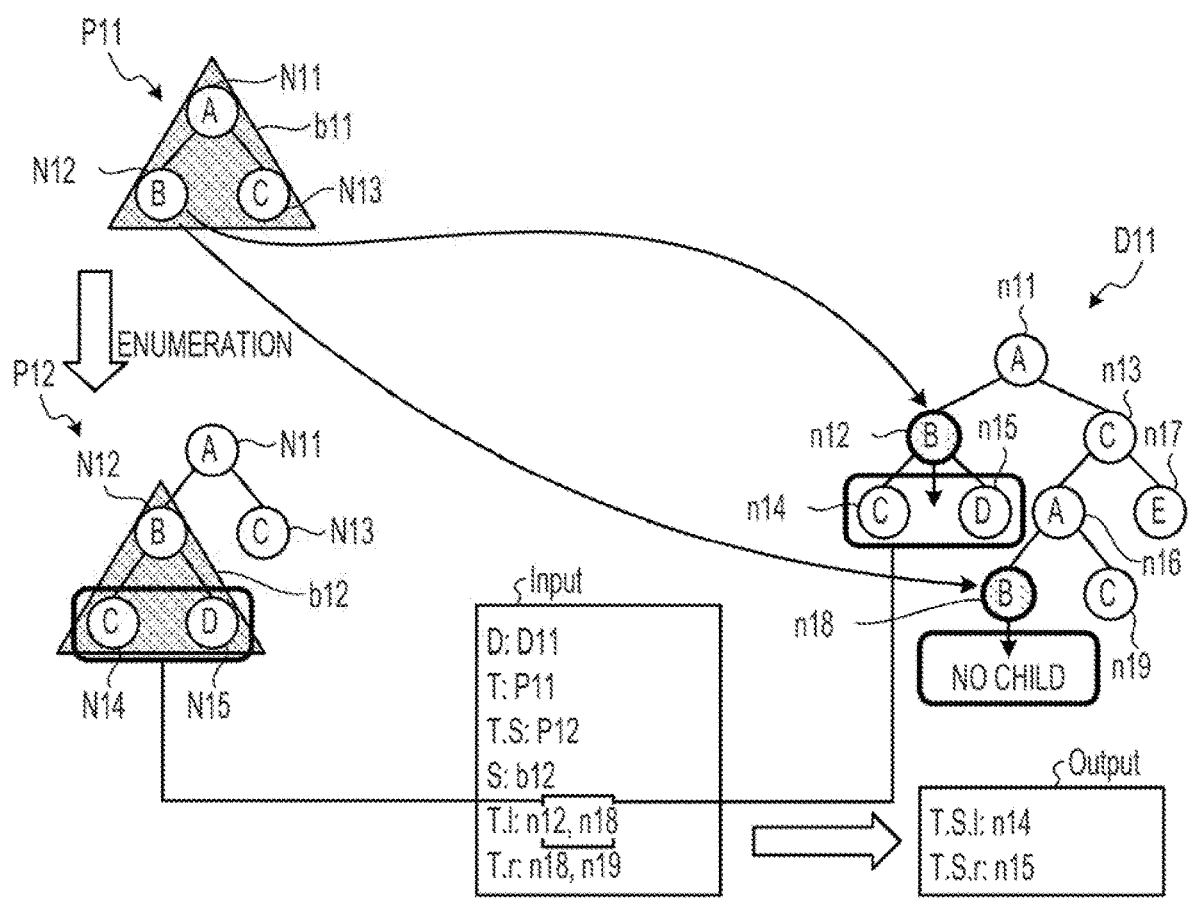
FIG. 7 is a diagram illustrating an operational example of a binary tree generation algorithm.

An operational example of the binary tree generation algorithm is described with reference to FIG. 7. FIG. 7 is a diagram illustrating the operational example of the binary tree generation algorithm. FIG. 7 illustrates the binary tree data D11, the binary tree pattern P11, and the binary tree pattern P12, which are illustrated in FIG. 4. FIG. 7 illustrates that nodes, links, and labels are represented in the same manner as FIG. 2.

As illustrated in FIG. 7, the binary tree pattern P11 and the binary tree pattern P12 are enumerated in this order by adding the minimum binary tree structure in specific order in accordance with the binary tree generation algorithm. The minimum binary tree structure is referred to as stump.

For example, at the stage of generating the binary tree pattern P12, data stored in a memory and managed by the searching unit 15c is as follows. In a storage region for the binary tree data "D", the binary tree data D11 to be searched is stored. In a storage region for the binary tree pattern "T.S", the newly generated binary tree pattern P12 is stored. In a storage region for the binary tree pattern "T", the binary tree pattern P11 previously generated before the generation of the binary tree pattern P12 is stored. In a storage region for the new stump "S", the stump b12 added to the binary tree pattern P11 is stored.

In this case, the binary tree pattern P11 includes only one stump or the stump b11. Thus, the stump b11 belongs to the rightmost stump column and is the rightmost bottom stump. When the binary tree pattern P11 is generated, the following data may be stored in a storage region for the left child appearance position list "T.l" of the rightmost bottom stump of the binary tree pattern "T" and a storage region for the right child appearance position list "T.r" of the rightmost bottom stump of the binary tree pattern "T". For example, in the storage region for the left child appearance position list "T.l" of the rightmost bottom stump of the binary tree pattern "T", the nodes n12 and n18 where the node N12 serving as the left child of the stump bit appears in the binary tree data D11 are stored. The stump bit is the rightmost bottom stump of the binary tree pattern P11. In the storage region for the right child appearance position list "T.r" of the rightmost bottom stump of the binary tree pattern "T", the nodes n13 and n19 where the node N13 serving as the right child of the stump bit appears in the binary tree data D11 are stored.

Under the aforementioned data management, a search for the binary tree pattern T.S is executed. Since the new stump S (or the stump b12) is coupled to the node N12 serving as the left child of the rightmost bottom stump b11 of the binary tree pattern T (=the binary tree pattern P11), the new stump S corresponds to the aforementioned item A. In this case, since the nodes n12 and n18 are stored in the left child appearance position list T.l of the rightmost bottom stump b11 of the binary tree pattern T (=the binary tree pattern P11), the nodes n12 and n18 are extracted as nodes "v" one by one.

For example, the case where the node n12 is extracted as a node v from the left child appearance position list T.l (=the nodes n12 and n18) is described below. In this case, a label of a left child v.l (=the node n14) of the node v (=the node n12) extracted from the left child appearance position list T.l and a label of a right child v.r (=the node n15) of the node v (=the node n12) are crosschecked with the label of the left child (=the node N14) of the new stump S (=the stump b12) and the label of the right child (=the node N15) of the new stump S (=the stump b12). In this case, the label (=C) of the left child v.l (=the node n14) of the node v (=the node n12) matches the label (=C) of the left child (=the node N14) of the new stump S (=the stump b12), The label (=D) of the right child vs (=the node n15) of the node v (=the node n12) matches the label (=D) of the right child (=the node N15) of the new stump S (=the stump b12). When the labels of the left and right children of the node v match the labels of the left and right children of the new stump 5, the left child v.l (=the node n14) of the node v (=the node n12) is registered in the storage region for the left child appearance position list T.S.l of the binary tree pattern T.S (=the binary tree pattern P12). The right child vs (=the node n15) of the node v (=the node n12) is registered in the storage region for the right child appearance position list T.S.r of the binary tree pattern T.S (=the binary tree pattern P12).

The case where the node n18 is extracted as a node v from the left child appearance position list T.l (=the nodes n12 and n18) is described below. In this case, the node v (=the node n18) extracted from the left child appearance position list T.l does not have a left child v.l and a right child v.r. Thus, any child is not registered in the right child appearance position list. T.S.r of the binary tree pattern T.S (=the binary tree pattern T.S).

As a result, the left child appearance position list T.S.l (=the node n14) of the binary tree pattern T.S (=the binary tree pattern P12) and the right child appearance position list T.S.r (=the node n15) of the binary tree pattern T.S (=the binary tree pattern P12) are obtained. Thus, as appearance positions of the binary tree pattern P12, differences between the binary tree patterns P11 and P12 or the left and right children of the added stump b12 may be displayed on the binary tree data D11.

Flow of Process

Figure 8:
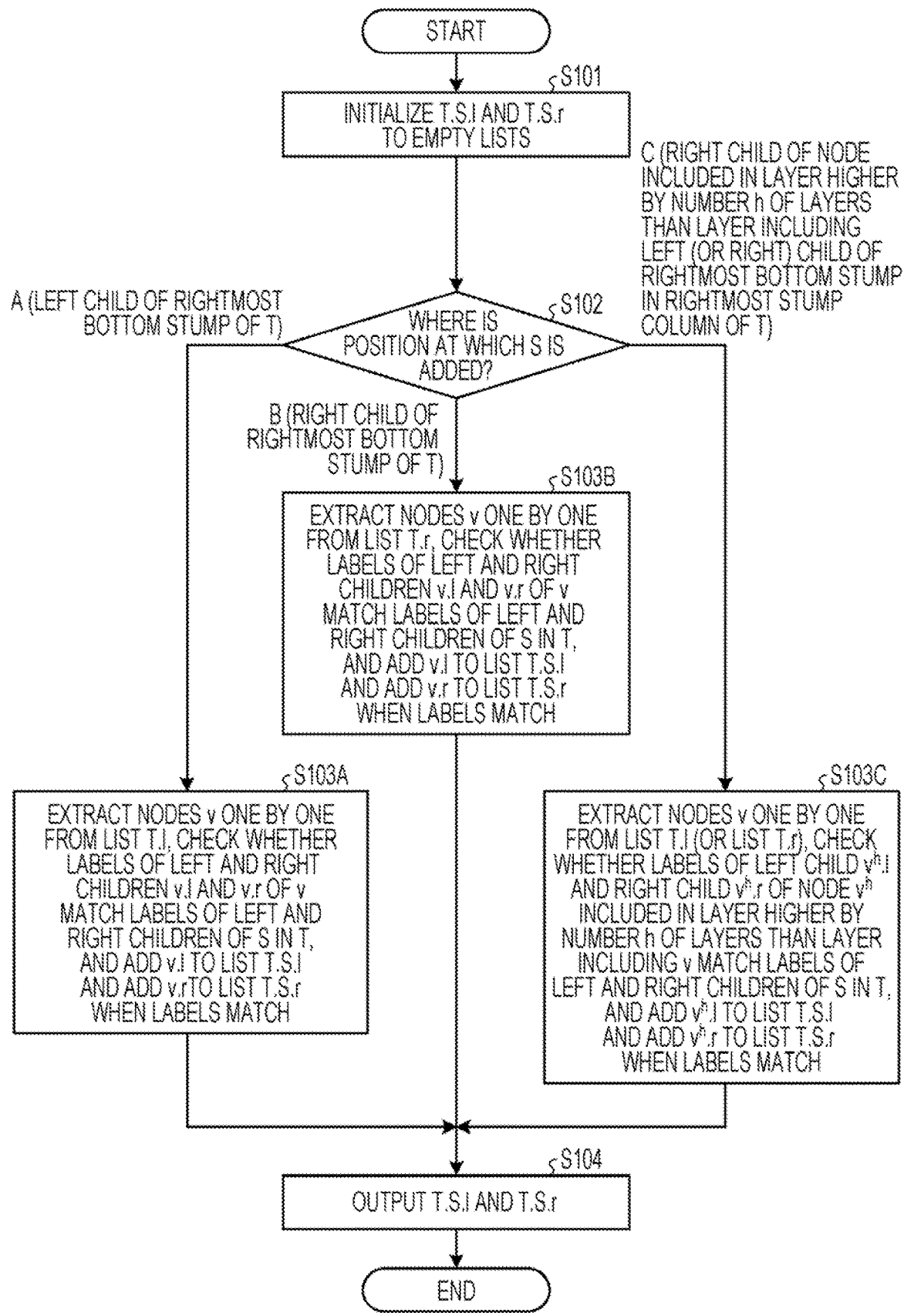
FIG. 8 is a flowchart illustrating a procedure for a search process according to the first embodiment.

FIG. 8 is a flowchart illustrating a procedure for the search process according to the first embodiment with reference to FIG. 1. As an example, the search process is started when the binary tree pattern T.S is generated by the generating unit 15b. As illustrated in FIG. 8, the searching unit 15c initializes the left child appearance position list T.S.l of the binary tree pattern T.S and the right child appearance position list T.S.r of the binary tree pattern T.S to empty lists (in step S101).

When the new stump S is added to the left child of the rightmost bottom stump of the binary tree pattern T (A in step S102), the searching unit 15c updates the left and right child appearance position list T.S.l and T.S.r of the binary tree pattern T.S based on results of the label crosschecking (in step S103A).

In step S103A, the following process is executed. That is, a node v is extracted from the left: child appearance position list T.l of the rightmost bottom stump of the binary tree pattern T. Labels of left and right children v.l and v.r of the node v extracted from the left child appearance position list. T.l of the rightmost bottom stump are crosschecked with the labels of the left and right children of the new stump S. In this case, when the label of the left child v.l of the node v matches the label of the left child of the new stump S, and the label of the right child v.r of the node v matches the label of the right child of the new stump S, the left child v.l of the node v is registered in the left child appearance position list T.S.l of the binary tree pattern LS, and the right child vs of the node v is registered in the right child appearance position list T.S.r of the binary tree pattern T.S.

When the new stump S is added to the left child of the rightmost bottom stump of the binary tree pattern T (B in step S102), the searching unit 15c updates the left and right child appearance position lists T.S.l and T.S.r of the binary tree pattern T.S based on results of the label crosschecking (in step S103B).

In step S103B, the following process is executed. That is, a node v is extracted from the right child appearance position list T.r of the rightmost bottom stump of the binary tree pattern T. Labels of left and right children v.l and v.r of the node v extracted from the right child appearance position list T.r of the rightmost bottom stump are crosschecked with the labels of the left and right children of the new stump S. In this case, when the label of the left child v.l of the node v matches the label of the left child of the new stump 5, and the label of the right child v.r of the node v matches the label of the right child of the new stump 5, the left child v.l of the node v is registered in the left child appearance position list T.S.l of the binary tree pattern T.S, and the right child v.r of the node v is registered in the right child appearance position list T.S.r of the binary tree pattern T.S.

When the new stump S is added to the right child of the stump belonging to the rightmost stump column of the binary tree pattern T (C in step S102), the searching unit 15c updates the left and right child appearance position lists T.S.l and T.S.r of the binary tree pattern T.S based on results of the label crosschecking (in step S103C).

In step S103C, the following process is executed. That is, a node v is extracted from the left child appearance position list T.l of the rightmost bottom stump of the binary tree pattern T. When the new stump S corresponds to the aforementioned item C, it is apparent from the binary tree generation algorithm that the new stump S is not added to the left child (or the right child) of the rightmost bottom stump and is added to the right child of the stump that is in the top layer and belongs to the rightmost stump column. Thus, the difference h, which is the number h of layers existing in the range from the left child (or right child) of the rightmost bottom stump of the binary tree pattern T to the right child of the stump that is in the top layer and belongs to the rightmost stump column of the binary tree pattern T, is calculated. Based on the difference h, labels of left and right children $v^h.l$ and $v^h.r$ of a node $v^h$ included in a layer higher by the number h of layers than a layer including the node v extracted from the left child appearance position list T.l of the rightmost bottom stump are crosschecked with the labels of the left and right children of the new stump S. In this case, when the label of the left child $v^h.l$ of the node $v^h$ matches the label of the left child of the new stump 5, and the label of the right child $v^h.r$ of the node $v^h$ matches the label of the right child of the new stump S, the left child $v^h.l$ of the node $v^h$ is registered in the left child appearance position list T.S.l of the binary tree pattern T.S, and the right child $v^h.r$ of the node $v^h$ is registered in the right child appearance position list T.S.r of the binary tree pattern T.S.

In each of steps S103A to S103C, when multiple nodes v are already registered in the left child appearance position list T.l of the rightmost bottom stump or the right child appearance position list T.r of the rightmost bottom stump, the multiple nodes v may be sequentially extracted and processes such as the aforementioned label crosschecking, the aforementioned list registration, and the like may be executed in this order, or the multiple nodes v may be extracted at one time and the processes may be executed in parallel.

After that, the output unit 15d displays and outputs various data and outputs audio based on the left and right child appearance position lists T.S.l and T.S.r obtained as a result of any of steps S103A to S103C (in step S104) and terminates the process.

Aspect of Effects

As described above, in a search for a specific binary tree pattern from target binary tree data, the searching device 10 according to the first embodiment uses binary tree patterns enumerated by adding a stump or the minimum binary tree unit to search for only appearance positions of added nodes. Thus, according to the searching device 10 according to the first embodiment, since the number of times that association is executed between nodes and the number of times that labels are crosschecked may be reduced, it may be possible to increase the speed of a search for a specific binary tree pattern.

SECOND EMBODIMENT

Although the first embodiment related to the device disclosed herein is described above, the disclosure may include various modifications other than the first embodiment. A second embodiment of the disclosure is described below.

Binary Tree Generation Algorithm

The first embodiment describes the expansion procedure in which the binary tree generation algorithm adds a new stump based on a "rightmost stump column" and a "rightmost bottom stump" as an example. The first embodiment, however, is not limited to this. For example, the binary tree generation algorithm may trace a binary tree pattern from a root stump of the binary tree pattern through a stump coupled to a left child or a stump coupled to a right child when the stump coupled to the left child does not exist. The binary tree generation algorithm may replace the "right children" with the "left children" and execute a procedure for expanding a binary tree pattern by adding a new stump based on a "leftmost stump column" and a "leftmost lower stump".

Distribution and Integration

The various constituent components of the devices illustrated in the drawings may not be physically configured as illustrated in the drawings. Specific forms of the distribution and integration of the devices are not limited to those illustrated in the drawings, and all or some of the devices may be functionally or physically distributed or integrated in arbitrary units based on various loads, usage statuses, or the like. For example, the receiving unit 15a, the generating unit 15b, the searching unit 15c, or the output section 15d may be an external device of the searching device 10 and may be coupled to the searching device 10 via a network. Another device may include the receiving unit 15a, the generating unit 15b, the searching unit 15c, or the output section 15d and may be coupled to the searching device 10 via the network and collaborate with the searching device 10 to enable the aforementioned functions of the searching device 10. Another device may hold all or a portion of the binary tree data 13a stored in the storage unit 13 and may be coupled to the searching device 10 via the network and collaborate with the searching device 10 to enable the aforementioned functions of the searching device 10.

Search Program

The various processes described in the first embodiment may be realized by causing a computer such as a personal computer or a workstation to execute a program prepared in advance. An example of the computer that executes the search program having the same functions as those described in the first embodiment is described below with reference to FIG. 9.

Figure 9:
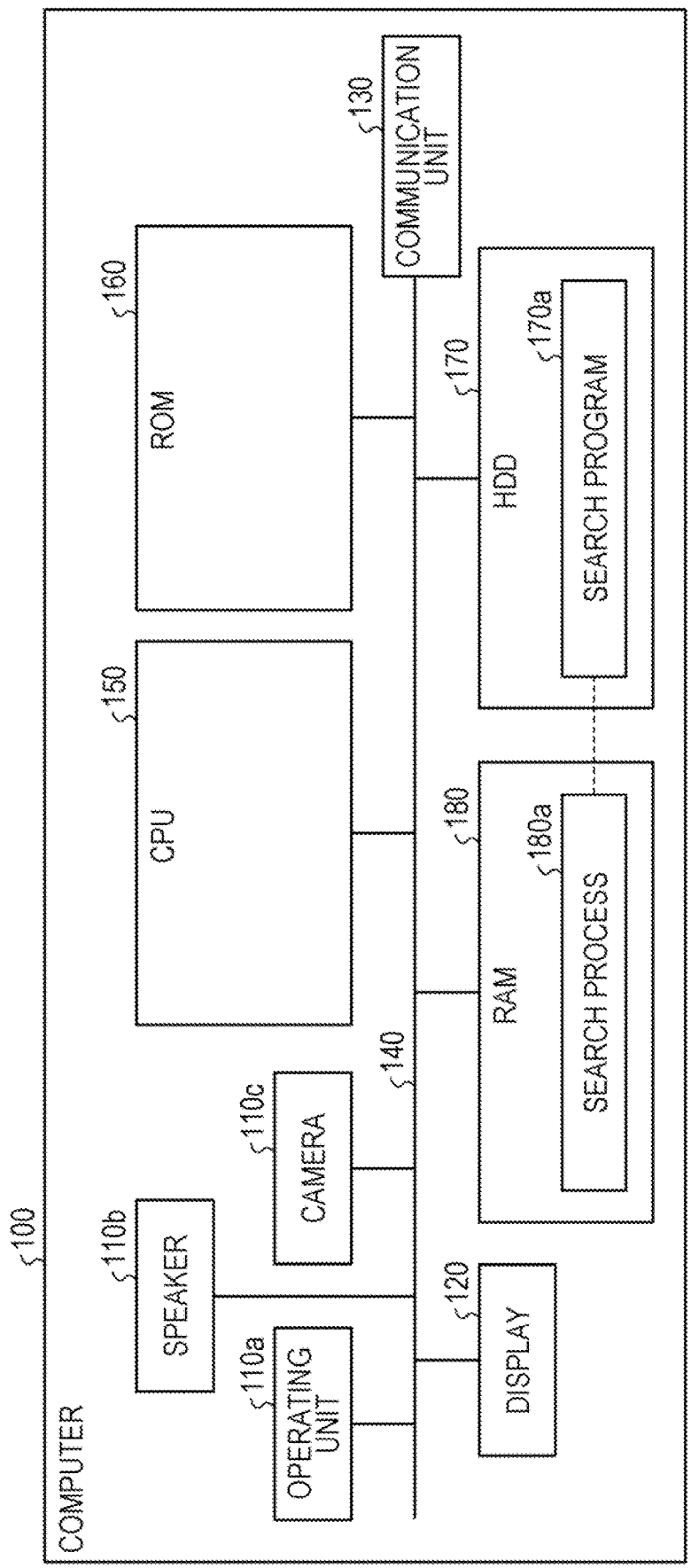
FIG. 9 is a diagram illustrating an example of a hardware configuration of a computer that executes a search program according to the first embodiment and a second embodiment.

FIG. 9 is a diagram illustrating an example of a hardware configuration of the computer that executes the search program according to the first and second embodiments. As illustrated in FIG. 9, a computer 100 includes an operating unit 110a, a speaker 110b, a camera 110c, a display 120, and a communication unit 130, The computer 100 includes a CPU 150, a read-only memory (ROM) 160, a hard disk drive (HDD) 170, and a RAM 180. The units 110 to 180 are coupled to each other via a bus 140.

As illustrated in FIG. 9, a search program 170a is stored in the HDD 170. The search program 170a may enable the same functions as the receiving unit 15a, the generating unit 15b, the searching unit 15c, and the output unit 15d, which are described in the first embodiment. The search program 170a may be unified as a single program or may be separated into portions in the same manner as the constituent components, which are the receiving unit 15a, the generating unit 15b, the searching unit 15c, and the output unit 15d, which are illustrated in FIG. 1, In the HDD 170, not all the data described in the first embodiment may be stored. It is sufficient if the data to be used for the processes is stored in the HDD 170.

Under the aforementioned environment, the CPU 150 reads the search program 170a from the HDD 170 and loads the search program 170a into the RAM 180. As a result, the search program 170a functions as a search process 180a, as illustrated in FIG. 9, The search process 180a loads various data read from the HDD 170 into a region allocated to the search process 180a and included in storage regions included in the RAM 180, and uses the loaded various data to execute the various processes. For example, the processes to be executed by the search process 180a include the processes described with reference to FIG. 8. In the CPU 150, not all the processing units described in the first embodiment may be operated. It is sufficient if a processing unit corresponding to a process to be executed may be virtually enabled in the CPU 150.

The search program 170a may not be stored in the HDD 170 or the ROM 160 in an initial state. For example, the search program 170a may be stored in a "portable physical medium" that is to be inserted in the computer 100 and is a flexible disk (FD), a CD-ROM, a DVD, a magneto-optical disc, an IC card, or the like. The computer 100 may acquire the search program 170a from the portable physical medium and execute the search program 170a. The program 170a may be stored in another computer or server device coupled to the computer 100 via a public line, the internet, a LAN, a WAN, or the like, and the computer 100 may acquire the search program 170a from the other computer or the server device via the public line, the internet, the LAN, the WAN, or the like and execute the search program 170a.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program causing a computer to execute a process, the process comprising:
　decomposing a first binary tree pattern into combinations of multiple binary tree units in accordance with a predetermined procedure; and
　when a second binary tree pattern configured as a combination of binary tree units that are among the multiple binary tree units and include a top binary tree unit of the multiple binary units is associated with a subset of a target binary tree data, searching the target binary tree data for the first binary tree pattern by using positions of the subset within the target binary tree data, wherein:
　the predetermined procedure includes:
　　expanding a first stump, configured as a minimum binary tree which includes a left child and a right child and whose root is not coupled to a stump, to a tree structure of stumps by repeating coupling of a new stump to a connection target stump, among the tree structure of stumps including the first stump, to which the new stump is to be coupled, in accordance with a predetermined expansion procedure, such that one or both of the left child and the right child of the first stump is coupled to a root of a stump that is positioned at a top of a series of stumps each configured as a minimum binary tree including a root, a left child, and a right child, and generating the combinations of multiple binary tree units from the generated tree structure of stumps by expanding each stump included in the tree structure of stumps to a binary tree unit, wherein the predetermined expansion procedure includes:

when the connection target stump is a first terminal stump that includes a right child and a left child both not coupled to a stump and is included in a rightmost stump column, which is a series of stumps that are included in the tree structure of stumps and obtained by tracing the tree structure of stumps from the first stump toward a stump coupled to a right child of the first stump or a stump coupled to a left child of the first stump when the right child of the first stump is not coupled to a stump, expanding the tree structure of stumps by coupling the new stump to a right child or a left child of the connection target stump;

when the connection target stump is included in the rightmost stump column of the tree structure of the stumps and is not the first terminal stump, expanding the tree structure of stumps by coupling the new stump to the right child of the connection target stump;

when the connection target stump is a second terminal stump that includes a right child and a left child both not coupled to a stump and is included in a leftmost stump column that is a series of stumps included in the tree structure of the stumps and obtained by tracing the tree structure of stumps from the first stump toward a stump coupled to a left child of the first stump or a stump coupled to a right child of the first stump when the left child of the first stump is not coupled to a stump, expanding the tree structure of stumps by coupling the new stump to a right child or a left child of the connection target stump;

when the connection target stump is included in the leftmost stump column of the tree structure of the stumps and is not the second terminal stump, expanding the tree structure of stumps by coupling the new stump to the left child of the connection target stump; and storing positions of the left child and the right child that are associated with identification information of the left child and the right child in storage regions of a memory, the predetermined procedure reduces a number of times that association is executed between nodes and that labels are crosschecked to increase the speed of a search for a specific binary tree pattern, and generates and uniquely enumerates a binary tree pattern by adding a minimum binary tree structure in a specific order to enable use of a problem-solution approach.

2. The non-transitory, computer-readable recording medium of claim 1, wherein when the new stump is coupled to the right child or the left child of the first terminal stump included in the rightmost stump column, the first binary tree pattern is searched at a position of a node in the target binary tree data at which the right child or the left child of the first terminal stump included in the rightmost stump column appears in the second binary tree pattern.

3. The non-transitory, computer-readable recording medium of claim 2, wherein when the new stump is coupled to a stump that is included in the rightmost stump column and is not the first terminal stump, the first binary tree pattern is searched at a position of a node in the target binary tree data at which a right child of a stump included in a layer higher than a layer including the first terminal stump in the rightmost stump column appears in the second binary tree pattern.

4. The non-transitory, computer-readable recording medium of claim 3, wherein the first binary tree pattern is searched by:

crosschecking first labels of a right child and a left child of the node with second labels of a right child and a left child of the new stump, and determining whether the first labels match the second labels.

5. The non-transitory, computer-readable recording medium of claim 1, wherein when the new stump is coupled to the right child or the left child of the first terminal stump included in the leftmost stump column, the first binary tree pattern is searched at a position of a node in the target binary tree data at which the right child or the left child of the second terminal stump included in the leftmost stump column appears in the second binary tree pattern.

6. The non-transitory, computer-readable recording medium of claim 5, wherein when the new stump is coupled to a stump that is included in the leftmost stump column and is not the second terminal stump, the first binary tree pattern is searched at a position of a node in the target binary tree data at which a right child of a stump included in a layer higher than a layer including the second terminal stump in the leftmost stump column appears in the second binary tree pattern.

7. The non-transitory, computer-readable recording medium of claim 6, wherein the first binary tree pattern is searched by:

crosschecking first labels of a right child and a left child of the node with second labels of a right child and a left child of the new stump, and determining whether the first labels match the second labels.

8. A method performed by a computer, the method comprising:

decomposing a first binary tree pattern into combinations of multiple binary tree units in accordance with a predetermined procedure; and when a second binary tree pattern configured as a combination of binary tree units that are among the multiple binary tree units and include a top binary tree unit of the multiple binary units is associated with a subset of a target binary tree data, searching the target binary tree data for the first binary tree pattern by using positions of the subset within the target binary tree data, wherein:

the predetermined procedure includes:

expanding a first stump, configured as a minimum binary tree which includes a left child and a right child and whose root is not coupled to a stump, to a tree structure of stumps by repeating coupling of a new stump to a connection target stump, among the tree structure of stumps including the first stump, to which the new stump is to be coupled, in accordance with a predetermined expansion procedure, such that one or both of the left child and the right child of the first stump is coupled to a root of a stump that is positioned at a top of a series of stumps each configured as a minimum binary tree including a root, a left child, and a right child, and generating the combinations of multiple binary tree units from the generated tree structure of stumps by expanding each stump included in the tree structure of stumps to a binary tree unit, wherein the predetermined expansion procedure includes:

when the connection target stump is a first terminal stump that includes a right child and a left child both not coupled to a stump and is included in a rightmost stump column, which is a series of stumps that are included in the tree structure of stumps and obtained by tracing the tree structure of stumps from the first stump toward a stump coupled to a right child of the first stump or a stump coupled to a left child of the first stump when the right child of the first stump is not coupled to a stump, expanding the tree structure of stumps by coupling the new stump to a right child or a left child of the connection target stump;

when the connection target stump is included in the rightmost stump column of the tree structure of the stumps and is not the first terminal stump, expanding the tree structure of stumps by coupling the new stump to the right child of the connection target stump;

when the connection target stump is a second terminal stump that includes a right child and a left child both not coupled to a stump and is included in a leftmost stump column that is a series of stumps included in the tree structure of the stumps and obtained by tracing the tree structure of stumps from the first stump toward a stump coupled to a left child of the first stump or a stump coupled to a right child of the first stump when the left child of the first stump is not coupled to a stump, expanding the tree structure of stumps by coupling the new stump to a right child or a left child of the connection target stump; and when the connection target stump is included in the leftmost stump column of the tree structure of the stumps and is not the second terminal stump, expanding the tree structure of stumps by coupling the new stump to the left child of the connection target stump.

9. The method of claim 8, wherein when the new stump is coupled to the right child or the left child of the first terminal stump included in the rightmost stump column, the first binary tree pattern is searched at a position of a node in the target binary tree data at which the right child or the left child of the first terminal stump included in the rightmost stump column appears in the second binary tree pattern.

10. The method of claim 9, wherein when the new stump is coupled to a stump that is included in the rightmost stump column and is not the first terminal stump, the first binary tree pattern is searched at a position of a node in the target binary tree data at which a right child of a stump included in a layer higher than a layer including the first terminal stump in the rightmost stump column appears in the second binary tree pattern.

11. The method of claim 10, wherein the first binary tree pattern is searched by:

crosschecking first labels of a right child and a left child of the node with second labels of a right child and a left child of the new stump, and determining whether the first labels match the second labels.

12. The method of claim 8, wherein when the new stump is coupled to the right child or the left child of the first terminal stump included in the leftmost stump column, the first binary tree pattern is searched at a position of a node in the target binary tree data at which the right child or the left child of the second terminal stump included in the leftmost stump column appears in the second binary tree pattern.

13. The method of claim 12, wherein when the new stump is coupled to a stump that is included in the leftmost stump column and is not the second terminal stump, the first binary tree pattern is searched at a position of a node in the target binary tree data at which a right child of a stump included in a layer higher than a layer including the second terminal stump in the leftmost stump column appears in the second binary tree pattern.

14. The method of claim 13, wherein the first binary tree pattern is searched by:

crosschecking first labels of a right child and a left child of the node with second labels of a right child and a left child of the new stump, and determining whether the first labels match the second labels.

15. An apparatus comprising:

a memory; and a processor coupled to the memory and configured to:

decompose a first binary tree pattern into combinations of multiple binary tree units in accordance with a predetermined procedure; and when a second binary tree pattern configured as a combination of binary tree units that are among the multiple binary tree units and include a top binary tree unit of the multiple binary units is associated with a subset of a target binary tree data, search the target binary tree data for the first binary tree pattern by using positions of the subset within the target binary tree data, wherein the predetermined procedure includes:

expanding a first stump, configured as a minimum binary tree which includes a left child and a right child and whose root is not coupled to a stump, to a tree structure of stumps by repeating coupling of a new stump to a connection target stump, among the tree structure of stumps including the first stump, to which the new stump is to be coupled, in accordance with a predetermined expansion procedure, such that one or both of the left child and the right child of the first stump is coupled to a root of a stump that is positioned at a top of a series of stumps each configured as a minimum binary tree including a root, a left child, and a right child, and generating the combinations of multiple binary tree units from the generated tree structure of stumps by expanding each stump included in the tree structure of stumps to a binary tree unit, wherein the predetermined expansion procedure includes:

when the connection target stump is a first terminal stump that includes a right child and a left child both not coupled to a stump and is included in a rightmost stump column, which is a series of stumps that are included in the tree structure of stumps and obtained by tracing the tree structure of stumps from the first stump toward a stump coupled to a right child of the first stump or a stump coupled to a left child of the first stump when the right child of the first stump is not coupled to a stump, expanding the tree structure of stumps by coupling the new stump to a right child or a left child of the connection target stump;

when the connection target stump is included in the rightmost stump column of the tree structure of the stumps and is not the first terminal stump, expanding the tree structure of stumps by coupling the new stump to the right child of the connection target stump;

when the connection target stump is a second terminal stump that includes a right child and a left child both not coupled to a stump and is included in a leftmost stump column that is a series of stumps included in the tree structure of the stumps and obtained by tracing the tree structure of stumps from the first stump toward a stump coupled to a left child of the first stump or a stump coupled to a right child of the first stump when the left child of the first stump is not coupled to a stump, expanding the tree structure of stumps by coupling the new stump to a right child or a left child of the connection target stump; and when the connection target stump is included in the leftmost stump column of the tree structure of the stumps and is not the second terminal stump, expanding the tree structure of stumps by coupling the new stump to the left child of the connection target stump.

16. The apparatus of claim 15, wherein when the new stump is coupled to the right child or the left child of the first terminal stump included in the rightmost stump column, the first binary tree pattern is searched at a position of a node in the target binary tree data at which the right child or the left child of the first terminal stump included in the rightmost stump column appears in the second binary tree pattern.

17. The apparatus of claim 16, wherein when the new stump is coupled to a stump that is included in the rightmost stump column and is not the first terminal stump, the first binary tree pattern is searched at a position of a node in the target binary tree data at which a right child of a stump included in a layer higher than a layer including the first terminal stump in the rightmost stump column appears in the second binary tree pattern.

18. The apparatus of claim 17, wherein the first binary tree pattern is searched by:
crosschecking first labels of a right child and a left child of the node with second labels of a right child and a left child of the new stump, and determining whether the first labels match the second labels.

19. The apparatus of claim 15, wherein when the new stump is coupled to the right child or the left child of the first terminal stump included in the leftmost stump column, the first binary tree pattern is searched at a position of a node in the target binary tree data at which the right child or the left child of the second terminal stump included in the leftmost stump column appears in the second binary tree pattern.

20. The apparatus of claim 19, wherein when the new stump is coupled to a stump that is included in the leftmost stump column and is not the second terminal stump, the first binary tree pattern is searched at a position of a node in the target binary tree data at which a right child of a stump included in a layer higher than a layer including the second terminal stump in the leftmost stump column appears in the second binary tree pattern.

* * * * *